(12) United States Patent
Wenger et al.

(10) Patent No.: US 6,439,209 B1
(45) Date of Patent: Aug. 27, 2002

(54) GAS-DYNAMIC PRESSURE WAVE MACHINE

(75) Inventors: Urs Wenger, Langenthal; Roger Martin, Othmarsingen, both of (CH)

(73) Assignee: Swissauto Engineering S.A. (CH)

( * ) Notice: Subject to any disclaimer, the term of this patent is extended or adjusted under 35 U.S.C. 154(b) by 0 days.

(21) Appl. No.: 09/486,303

(22) PCT Filed: Aug. 25, 1998

(86) PCT No.: PCT/EP98/05376

§ 371 (c)(1),
(2), (4) Date: Feb. 24, 2000

(87) PCT Pub. No.: WO99/11913

PCT Pub. Date: May 11, 1999

(30) Foreign Application Priority Data

Aug. 29, 1997 (EP) ............................................. 97810613

(51) Int. Cl.[7] .............................................. F02B 33/00
(52) U.S. Cl. ...................... 123/559.2; 417/64; 60/39.45
(58) Field of Search .................... 123/559.2; 60/600, 60/601, 602, 603, 39.45; 417/64

(56) References Cited

U.S. PATENT DOCUMENTS

| | | | |
|---|---|---|---|
| 2,800,120 A | | 7/1957 | Jendrassik |
| 3,011,487 A | | 12/1961 | Berchtold |
| 3,958,899 A | | 5/1976 | Coleman, Jr. et al. |
| 4,309,972 A | * | 1/1982 | Vallance et al. .......... 417/64 X |
| 4,592,330 A | * | 6/1986 | Mayer ..................... 123/559.2 |
| 4,723,525 A | * | 2/1988 | Fried et al. .............. 123/559.2 |
| 5,522,217 A | * | 6/1996 | Zauner .................... 417/64 X |

FOREIGN PATENT DOCUMENTS

| | | |
|---|---|---|
| CH | 681738 | 5/1993 |
| DE | 1052626 | 6/1956 |
| DE | 3040648 | 6/1981 |
| EP | 0210328 | 2/1987 |
| GB | 915827 | 1/1963 |
| JP | 62-020630 | 1/1987 |
| JP | 4-081510 | 3/1992 |
| WO | 97/20134 | 6/1997 |

* cited by examiner

*Primary Examiner*—Hoang Nguyen
(74) *Attorney, Agent, or Firm*—Ostrolenk, Faber, Gerb & Soffen, LLP (57) ABSTRACT

The gas-dynamic pressure wave machine, which is destined for the charge air supply of an internal combustion engine, comprises a rotor, a low pressure fresh air inlet channel, a high pressure charge air channel leading to the internal combustion engine, a high pressure exhaust channel coming from the internal combustion engine, and a low pressure exhaust channel the low pressure exhaust channel and the high pressure exhaust channel being enclosed in a gas housing and the low pressure fresh air inlet channel and the high pressure charge air channel being enclosed in an air housing, and each of all four channels communicating with the rotor through sector-shaped openings in their respective housings. The sector-shaped openings of the high pressure charge air channels are adjustably arranged in order to allow an adjustment of the process over the entire performance field of the internal combustion engine. For a further, even better adjustment of the process, the ratio of the total opening width of the high pressure channels to the total opening width of the low pressure channels is equal to or less th 1:3.25 while the total opening width of the high pressure channels amounts to 45° at the most. A further improvement is obtained by the fact that the air housing and/or the rotor casing are provided with a water cooling system.

32 Claims, 7 Drawing Sheets

GAS-DYNAMIC PRESSURE WAVE MACHINE

BACKGROUND OF THE INVENTION

The present invention refers to a gas-dynamic pressure wave machine according to the preamble of the independent claims.

Figure 1:
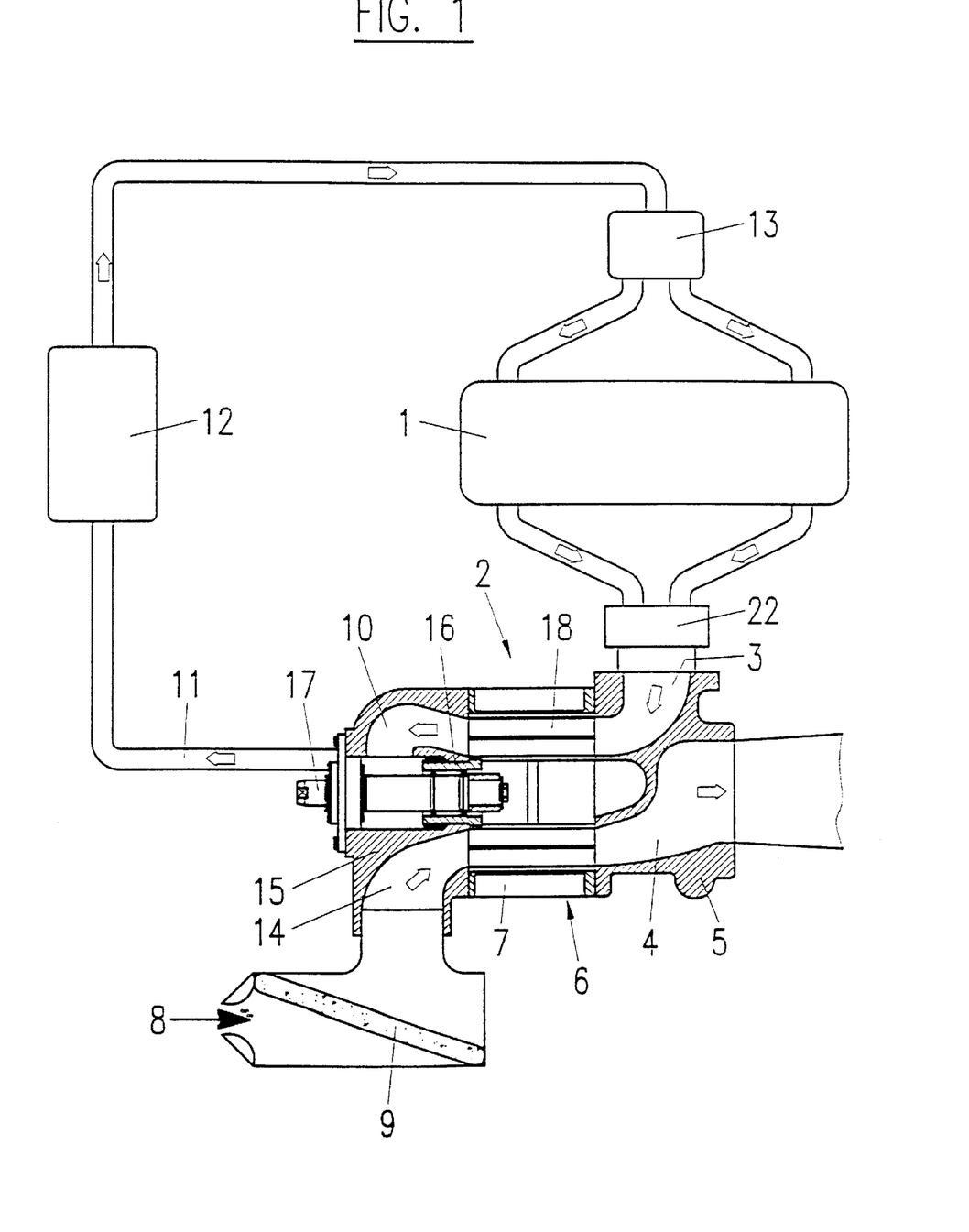
FIG. 1 shows a general illustration of a gas-dynamic pressure wave machine according to the prior art in a partly sectioned view.
Figure 2:
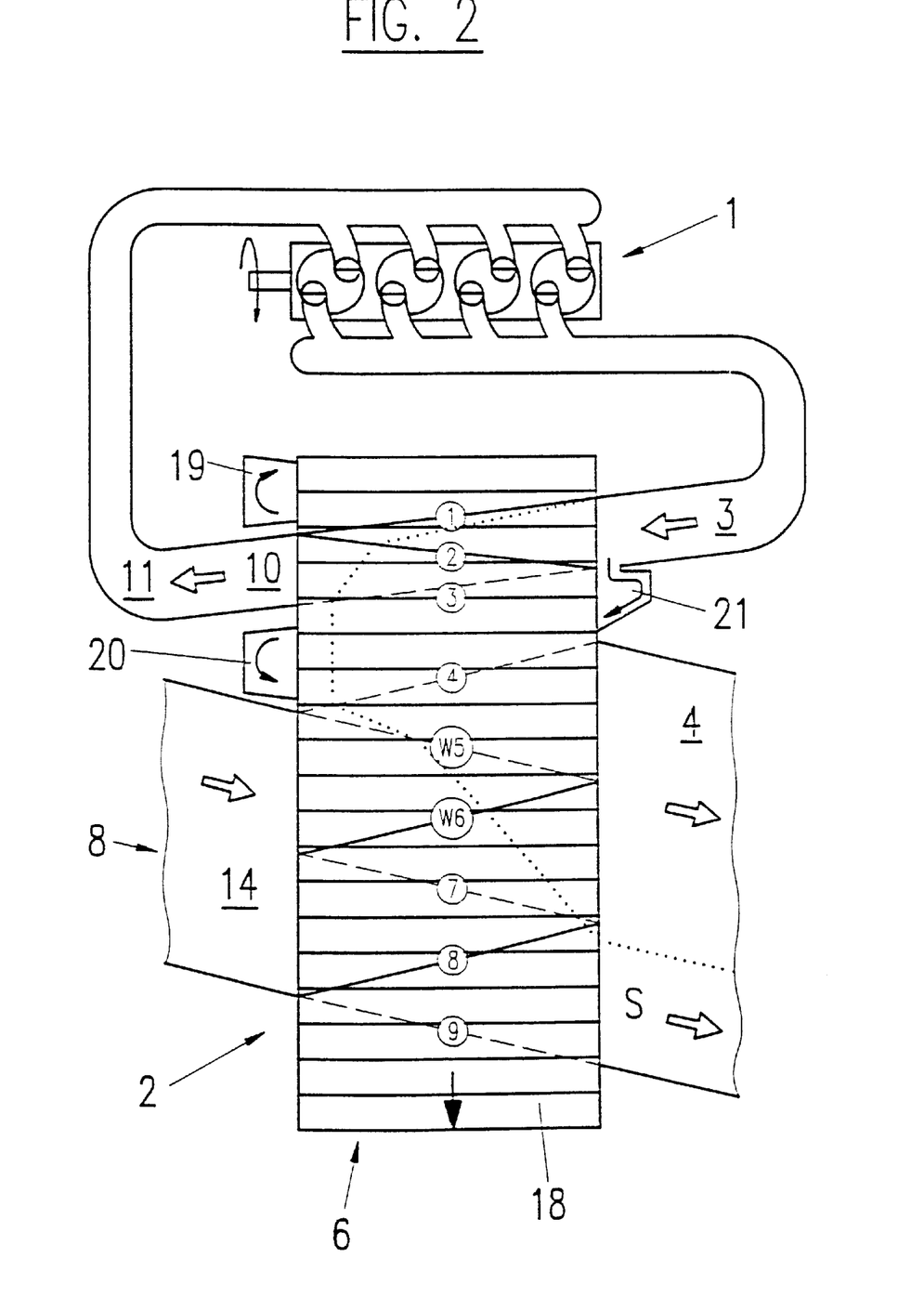
FIG. 2 schematically shows a developed cylindrical section through the cells of a rotor of a pressure wave machine according to the prior art.

Such a pressure wave machine is known from the prior art, e.g. from CH-A-681 738. It is a first general object of the present invention to improve the efficiency of a gas-dynamic pressure wave machine according to the state of the art as is schematically illustrated in FIGS. 1 and 2 by means of different measures.

In a gas-dynamic pressure wave machine according to the state of the art, comprising four channels and no additional control systems such as pockets, which is used in order to supercharge an internal combustion engine, the pressure wave process can only be adjusted for a single operating speed of the internal combustion engine, i.e. the so-called design point of the pressure wave machine. The use of pockets in the housing walls allows a less tuning-sensitive design of the pressure wave machine and a significant extension of its load, speed, and volume range. The disadvantage of this method is that in the range of untuned performance, the pressure wave process is diverted to secondary processes which cannot yield optimum efficiency. The result is an increase of the losses caused by such secondary processes in the pockets, e.g. inflowing and outflowing gases and the production of pressure and expansion waves by the pockets.

The transition from the so-called primary process, also called compression pocket process, to the principal process, i.e. the tuned process, causes disturbances in the pressure wave process which cause scavenging disruptions and thus ranges of increased recirculation of exhaust gas into the charge air. In order to prevent an increased recirculation in these ranges as well as during starting, an inlet leading to the gas pocket, either in the form of a milled sill or of a controlled inlet as disclosed in the above-mentioned document, must be provided, which however produces further losses due to a diversion of high pressure energy into the low pressure process.

The mutual alignment of the openings of the two high-pressure channels, i.e. of the high pressure exhaust channel and of the high pressure charge air channel, is an important regulating variable which can be influenced by the gas pocket, inter alia.

Attempts have been made to control this alignment, e.g. according to DE-B-1 052 626, DE-A-30 40 648, or finally according to U.S. Pat. No. 3,011,487. The cited publications disclose the use of plates or rings having openings and which are provided at the entrance of the mentioned channels to the air resp. to the gas housing, these plates or rings being attached to the respective housings and being mutually adjustable in order to act upon the alignment of the orifices of the high-pressure channels. These devices including plates have the drawback that they involve a complicated construction and cause additional losses due to the plate surfaces which must be sealed.

WO 97/20134 discloses a device for supercharging the charge air of an internal combustion engine by means of a multiple cycle pressure wave machine having a compression slide valve where the opening and the closing edges of the inlet and the outlet opening of the exhaust front housing and the charge air front housing are mutually offset in the direction of rotation of the cell rotor at a predetermined rotation speed of the cell rotor and a exhaust gas temperature. In the embodiment of the pressure wave machine having a compression slide valve, it is suggested to rotate the exhaust front housing. Since this is the high temperature part of the pressure wave machine, a device for the rotation of the exhaust front housing acting on this portion is disadvantageous.

SUMMARY OF THE INVENTION

On the background of this prior art, it is a first object of the present invention to provide a gas-dynamic pressure wave machine which allows an adjustment of the process over the entire performance range of the internal combustion engine in a simple manner and without any additional losses due to plate joints, and particularly without a detrimental influence of high temperatures, by a variation of the mutual alignment of the high pressure channel openings. This object is attained according to independent claim 1 or 3.

In order to ensure a high efficiency of the pressure wave machine over the entire speed range of the internal combustion engine by means of the disposition of the edge geometry of the channels at the rotor, it is indispensable to provide a sufficient rotor scavenging of the pressure wave machine at higher motor speeds to prevent an excessive increase of the charge air temperatures. Consequently, in pressure wave machines of the prior art, the width of the openings of the low pressure channels is designed for higher engine speeds, i.e. as wide as possible, while the openings of the high pressure channels are as narrow as possible. For lower to medium engine speeds, temperatures, and flow rates, however, this edge geometry, i.e. wide low pressure channels and narrow high pressure channels, becomes problematic.

On the background of this prior art, it is another object of the invention to improve the charging efficiency of a pressure wave machine in the range of lower to medium engine speeds, temperatures, and flow rates of the internal combustion engine. This object is attained by the pressure wave machine according to independent claim 8.

In known pressure wave machines of the prior art, the rotor runs in a bearing with lifetime lubrication which is exposed to an air current in an inlet of the intake channel of the pressure wave machine and is thereby cooled. The drawback of this system is the heating of the input air resulting from the cooling of the bearing and the disadvantageous configuration of the inlet channels with respect to the flow, which results in a reduced efficiency. Furthermore, it is possible that the cooling of the bearing is no longer ensured e.g. when the internal combustion engine is stopped after a long trip. Moreover, under certain load conditions, the temperature level of the bearing is still so high in spite of the input air cooling that expensive high-temperature lubricants must be used.

The axial clearances between the housings and the rotor greatly influence the efficiency of the pressure wave machine. In the case of excessive play, the gap losses will increase, and if the play is too small, it is possible that the rotor will graze against the housings. In order to reduce the play, the parts may be manufactured from a low-expansion steel alloy. In this case, however, a relatively large clearance must be provided in the cold state, which is disadvantageous in that condition, besides the need for expensive special alloys.

U.S. Pat. No. 2,800,120 discloses a pressure wave supercharger having a water-cooled end plate in which the rotor is journalled on the gas side. However, neither the air side nor the external surface are cooled by this cooling system.

On the background of this prior art, it is further object of the invention to provide an efficient cooling of the rotor resp. of the rotor bearing which eliminates the drawbacks indicated above and therefore allows a further improvement of the efficiency without using expensive alloys. This object is attained by means of the pressure wave machine according to independent claim 12.

Further advantages and embodiments of the pressure wave machine according to the invention are defined in the dependent claims.

BRIEF DESCRIPTION OF THE DRAWINGS

The invention is explained in more detail hereinafter with reference to a drawing of exemplary embodiments.

DETAILED DESCRIPTION OF THE INVENTION

Figure 5:
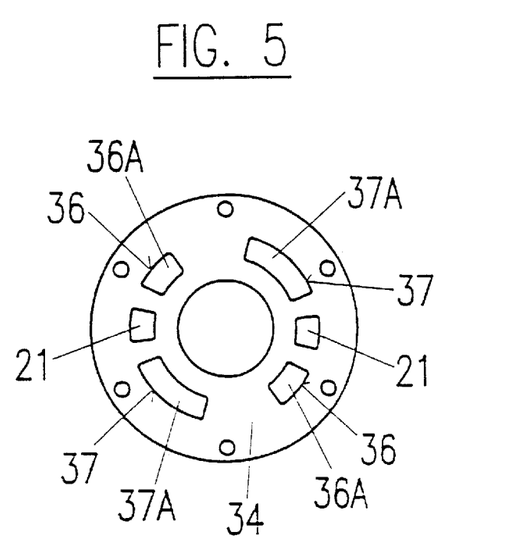
FIG. 5 shows a cross-section according to line V—V in FIG. 3 on a different scale.
Figure 6:
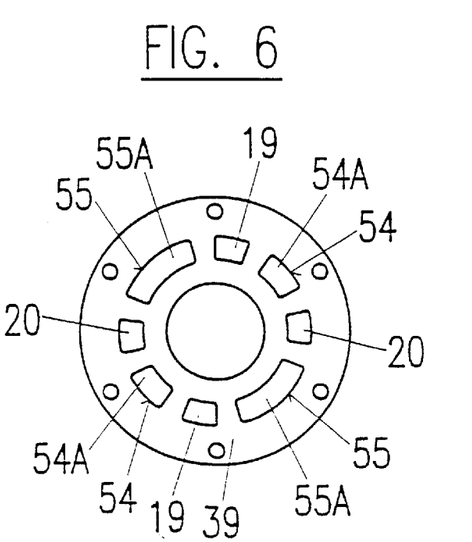
FIG. 6 shows a cross-section according to line VI—VI in FIG. 3 on a different scale.
Figure 7:
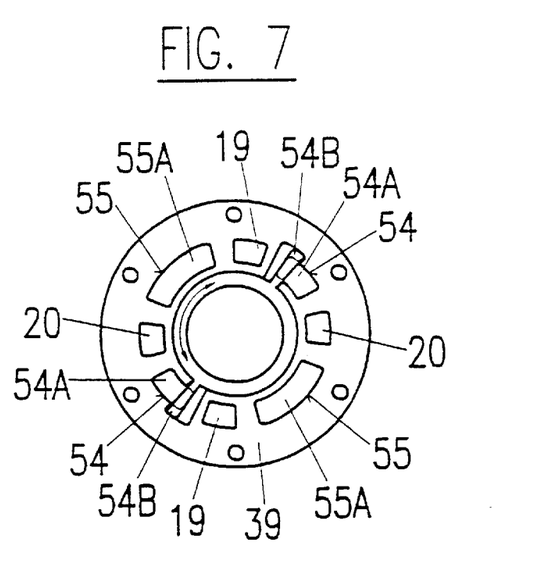
FIG. 7 shows a variant of the cross-section according to FIG. 6.

For the sake of simplicity, a single pressure wave cycle is described and represented in the developed views while FIGS. 5–7 show a two-cycle machine. However, the invention is independent from the number of pressure wave cycles, and it may be applied to single-cycle or to two or multiple cycle pressure wave machines. Since a respective opening and a respective pocket is associated to each cycle and since most pressure wave machines comprise two or three cycles, the description mostly refers to two openings resp. two cycles although the same would apply to a single cycle resp. opening.

FIG. 1 shows a gas-dynamic pressure wave machine 2 of the prior art which is connected to an internal combustion engine 1 by exhaust manifold 22 and further includes high pressure exhaust channel 3, low pressure exhaust channel 4, said channels being comprised in a gas housing 5, rotor 6 with external casing 7, fresh air inlet 8 with air filter 9, and the following low pressure fresh air inlet channel 14.

Furthermore, high pressure charge air channel 10 is illustrated which communicates with charge air passage 11, the latter being connected via charge air cooler 12 to engine 1 by input air manifold 13. Low pressure fresh air inlet channel 14 and high pressure charge air channel 10 are contained in an air housing 15. The figure further illustrates rotor bearing 16 as well as rotor drive 17.

FIG. 2 shows a developed view of the rotor of a pressure wave machine which approximately corresponds to the embodiment of FIG. 1 where only one cycle is illustrated. Identical elements are designated by the same reference numerals, i.e. internal combustion engine 1, gas-dynamic pressure wave machine 2, high pressure exhaust channel 3 and low pressure exhaust channel 4 including scavenging air S, rotor 6 with individual cells 18, fresh air inlet 8 resp. low pressure fresh air inlet channel 14, high pressure charge air channel 10 which communicates with charge air passage 11 and leads to internal combustion engine 1.

As already mentioned in the introduction, the process can only be adjusted to a single operating speed of the internal combustion engine if the four channels are used without any additional regulating devices. In this context, this is called the design point of the pressure wave machine. The use of pockets in the housing wall allows a more tuning-insensitive design of the pressure wave machine and thus an important expansion of its load, speed, and volume range. In the course of the development of such pressure wave machines over the years, different pockets have been milled into the housing wall, i.e., as shown in FIG. 2, a compression pocket 19, an expansion pocket 20, and a gas pocket 21 whose applications are well known to those skilled in the art. A disadvantage in the application of such pockets is that in the range of untuned performance, the pressure wave process is diverted to secondary processes which never yield optimum efficiency.

Figure 3:
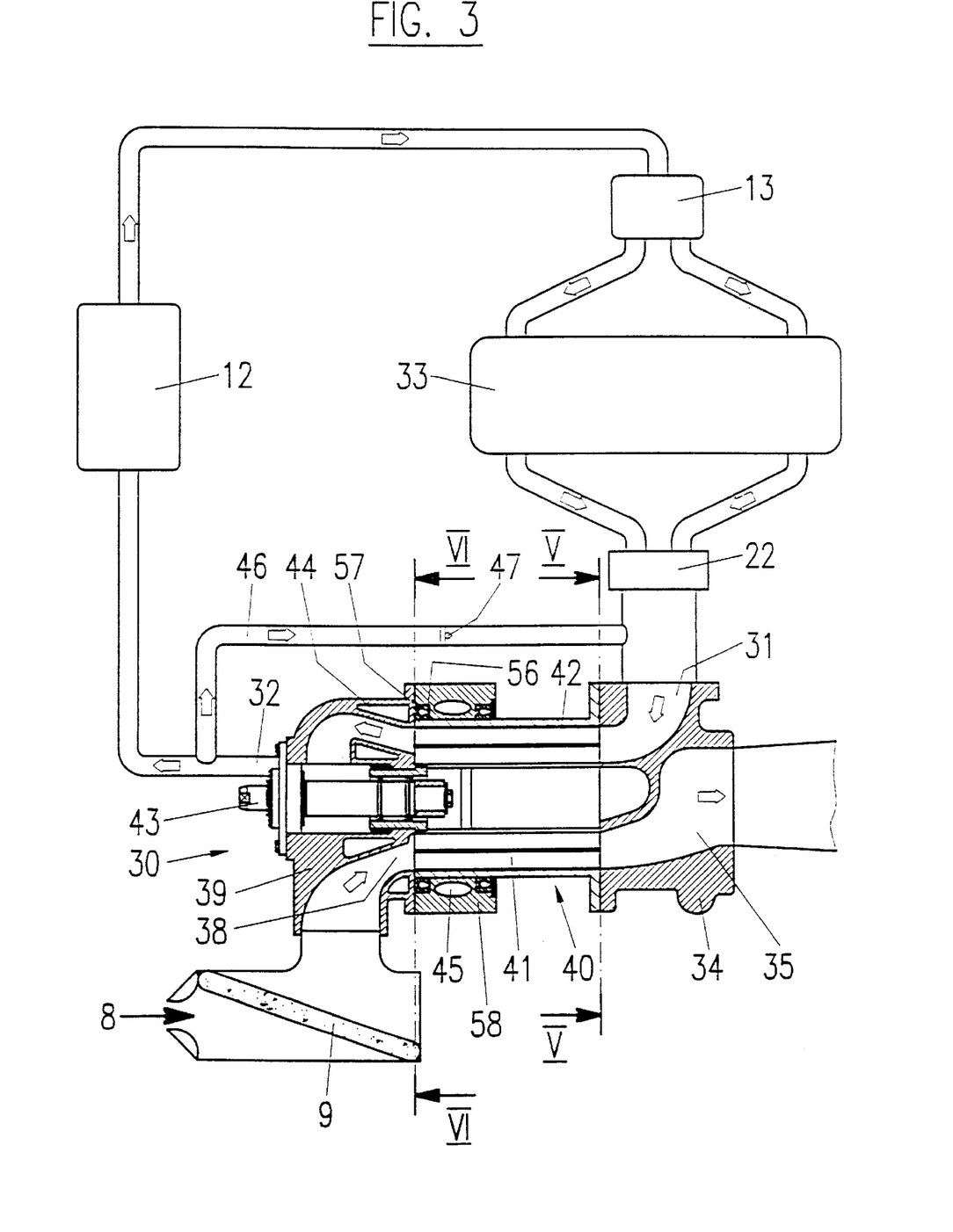
FIG. 3 shows the pressure wave machine according to the invention in the same view as FIG. 1.
Figure 4:
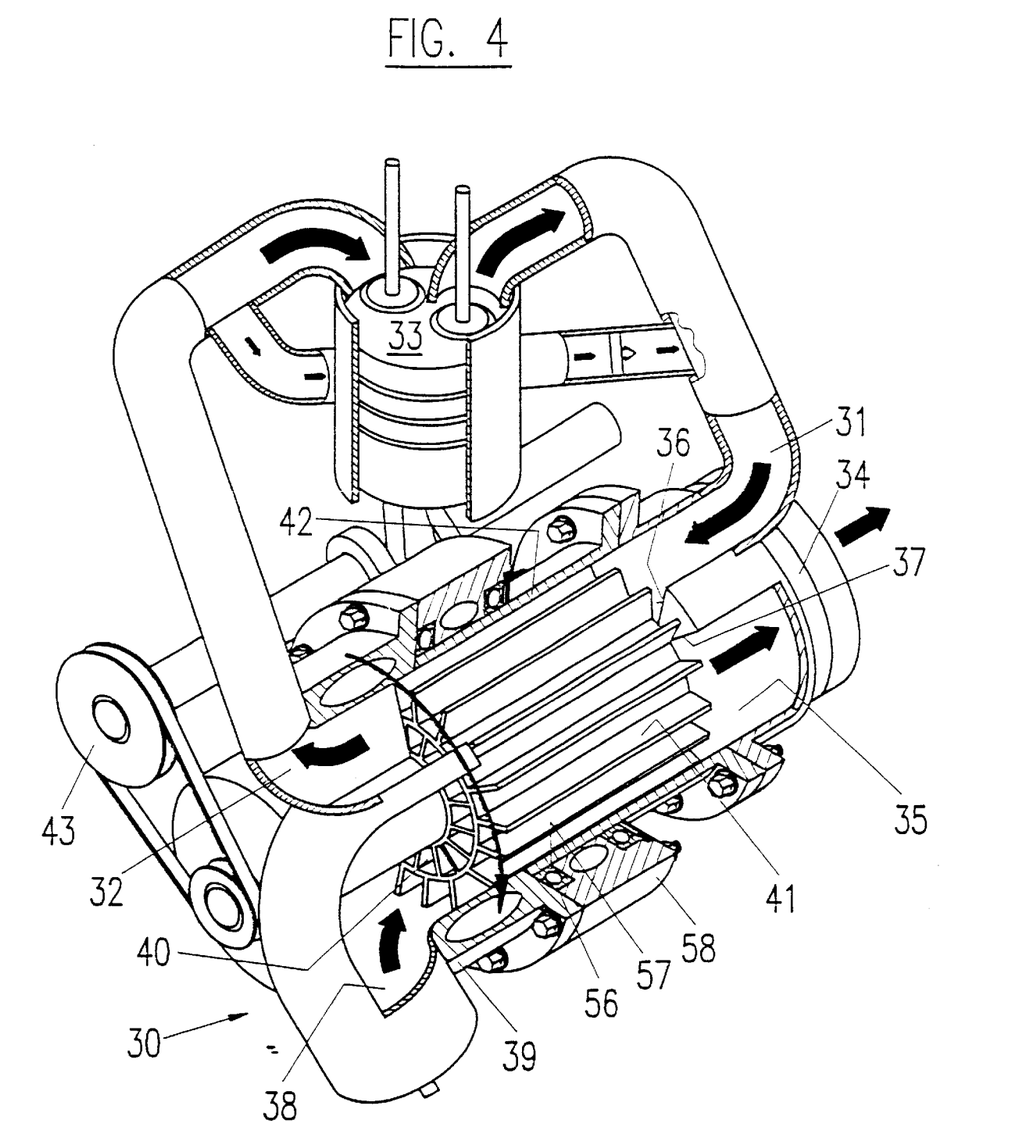
FIG. 4 shows a perspective view of a gas-dynamic pressure wave machine according to FIG. 3.

FIGS. 3 and 4 illustrate a gas-dynamic pressure wave machine according to the invention which comprises a number of improvements in order to essentially increase the overall efficiency. Pressure wave machine 30 is connected to the schematically illustrated internal combustion engine by high pressure exhaust channel 31 and high pressure charge air channel 32. Gas housing 34 further comprises low pressure exhaust channel 35, and this figure shows that the two channels, i.e. the high pressure exhaust channel and the low pressure exhaust channel, enter the gas housing on the rotor side in the form of sector-shaped openings 36A and 37A having opening edges 36 and 37, respectively, see also FIGS. 5 and 6. Further illustrated is rotor 40 with its cells 41, the rotor being arranged in an casing 42 and driven e.g. by means of a belt drive 43.

It is intended to adjust the alignment of opening edges 36 of the high pressure exhaust channel to opening edges 54 of the high pressure charge air channel in such a manner that the so-called primary wave, which is created when the high pressure exhaust channel opens toward the rotor cell whose pressure is lower, is precisely adjusted so as to arrive on the air side when the high pressure charge air channel opens toward the rotor cell. As already mentioned in the introduction, it has been attempted previously to obtain this adjustment by providing the housing with rotatable plates with openings in order to act upon the two high pressure flows.

In one solution according to the invention, the opening edges 54 of high pressure charge air channel 32, i.e. the openings communicating with the rotor cells, are adjusted either by a rotation of the air housing with respect to the stationary rotor and the gas housing, or of the high pressure charge air channel only. The result is that the opening edges of the two high pressure channels can always be mutually adjusted in such a manner that the primary wave fulfills the above-mentioned condition at any point of the performance range of the internal combustion engine.

FIG. 5 shows a front view of the rotor side of gas housing 34 illustrating the two high pressure exhaust channel openings 36A, each comprising an opening edge 36, and the two low pressure exhaust channel openings 37A, each comprising an opening edge 37, and the two gas pockets 21. In the present embodiment, the gas housing is fixed to the rotor casing, i.e. stationary.

FIG. 6 shows a front view of the rotor side of air housing 39 illustrating the two high pressure charge air channel openings 54A, each comprising an opening edge 54, and the two low pressure exhaust channel openings 55A, each comprising an opening edge 55. Furthermore, compression pockets 19 and expansion pockets 20 are illustrated. As previously mentioned, the air housing is rotatable with respect to the rotor resp. the gas housing, the angle of rotation being comprised between 0 and 20°.

FIG. 7 illustrates another solution allowing to act upon the opening edges of one of the high pressure channels, i.e. the high pressure charge air channel in the present case. In contrast to the solution involving a rotatable housing, the influence of high temperatures is not crucial in this solution. In contrast to FIG. 6, a double sector diaphragm 54B is illustrated which allows a variation of the opening width of the two openings of the high pressure charge air channel and thus of their alignment to the openings of the high pressure exhaust channel, as indicated by arrow 56. It is understood that the number of diaphragms depends on the number of cycles. Moreover, the diaphragms may be provided on the high pressure exhaust channel instead of the high pressure charge air channel as the influence of the temperature is not so important in this case.

Normally, the pressure wave machine is optimally tuned to the point specified by the manufacturer of the internal combustion engine, usually at the nominal speed of the motor, by means of known methods such as characteristics methods and design calculations while no pockets are involved or one, two, or all three pockets are used.

Compared to the application of regulating plates, the rotation of a housing or of one or both high pressure channels offers a considerable simplification, particularly with respect to the sealing action. FIGS. 3 and 4 schematically indicate that air housing 39 may be adjustably mounted by means of a rotatable bearing 40. The rotatable bearing is mounted on top of rotor casing 42 while two inner bearing rings 56 are fastened to the casing and two outer bearing rings 57 are fastened to air housing 39 and enclosed in a bearing housing 58. The housing may be rotated e.g. electrically by means of a servo motor, or by pneumatic, mechanical or hydraulic means. To this end, each point of the performance field of the internal combustion engine is calculated by means which are known per se and converted into suitable control commands for the rotation of the housing by an appropriate electronic control system. The same procedures can be applied if a rotation of the high pressure charge air channel is effected.

The rotor of the pressure wave machine may be driven proportionally by means of a belt drive, as illustrated, or non-proportionally e.g. by electric, pneumatic or hydraulic means. However, the rotor of the pressure wave machine may also be operated as a free-wheeling rotor without an external drive. In this case, the rotation of the housing must be adaptable to the speed variations of the machine by a suitable method, e.g. by performance field or speed control, while the speed of the rotor may be free or upwardly limited and partially controlled by a brake control. The same procedures can be applied if a rotation of the high pressure charge air channel is effected.

Although it is basically possible to apply the invention on the gas side, i.e. to rotate either gas housing 34 along with high pressure exhaust channel openings 36 or only the high pressure exhaust channel, resp. its openings, and although a combined rotation of the gas and the air side is theoretically conceivable, a rotation of the elements on the gas side implies great technical complications on account of the high temperatures involved.

As appears in FIG. 2, in conventional machines, the edge geometry, i.e. the opening width of the high pressure and the low pressure channels is designed so as to obtain a good efficiency over the entire speed range of the internal combustion engine. Therefore, even in the case of narrow total opening angles of the high pressure channels below 45°, the total opening width of the opening edges of the low pressure channels is designed to be as large as possible in order to obtain a sufficient rotor scavenging at higher motor speeds and thus to prevent an excessive increase of the charge air temperatures. In the pressure wave machines of the prior art, the overall ratio of the opening width of the high pressure channels to the opening width of the low pressure channels is greater than 1:3.5.

As already mentioned, in the case of low to medium speeds, temperatures, and flow rates, the result is a hindrance of the scavenging action and an insufficient precompression on account of the excessively large low pressure channels, which is due to the fact that according to FIG. 2, expansion wave W5, which is created by the pressure differential between the pressure existing in the rotor before the fresh air is admitted and the lower pressure in the low pressure exhaust channel itself, arrives at the centre of the low pressure exhaust channel approximately, where it hinders the outflow. Pressure wave W6, which results from the reflection of the expansion wave at the low pressure exhaust channel opening, travels back to the second third of the fresh air inlet opening and thereby strongly hinders the inflow. The result is a negative effect both on the scavenging action and on the pressure in the rotor at the time when the low pressure openings are closed.

The pressure, also called precompression in the following, strongly drops and is insufficient for a further compression of the charge air at the time when the high pressure exhaust channel opens. Moreover, in the prior arrangement with large low pressure channels and narrow high pressure channels, in order to improve the charging pressure at higher speeds, the low pressure fresh air inlet channel must close much later than the low pressure exhaust channel so that there is still a certain precompression due to the stemming of the inflowing fresh air. However, this measure is counteractive at a low energy level, i.e. mainly at low speeds, temperatures, and flow rates, where the scavenging is strongly hindered by the premature closure of the exhaust outlet opening and a range of high recirculation has thus to be accepted.

Since the opening edges are sector-shaped, their opening width is generally defined by an angle. In this context, independently of the number of cycles, reference is made to the total opening width. In pressure wave machines according to the prior art, the ratio of the total opening width of the opening edges of the high pressure channels and all opening edges of the low pressure channels is greater than 1:3.25, i.e. if the total opening width of the opening edges of the high pressure channels amounts to e.g. 48°, all opening edges of the low pressure channels have an opening width of 156° or more.

In FIGS. 5–7, the total opening width of the high pressure channels is equal to 2×20°=40° and the total opening width of the low pressure channels is approx. 2×65°=130°. Due to the fact that the total ratio of the openings of the high pressure channels, i.e. of the high pressure exhaust channel resp. of the high pressure charge air channel, to the openings of the low pressure channels, i.e. of the low pressure exhaust channel resp. of the low pressure fresh air inlet channel, is reduced to 1:3.25 or less and that the total opening width of the high pressure 35 channels is equal to or lower than 45°, both a better scavenging action and a higher precompression can be obtained and thus a higher efficiency at low and medium speeds, temperatures, and loads of the internal combustion engine.

In order to prevent a scavenging disruption in the case of an insufficient energy level, the angular difference between the closing edge of the low pressure exhaust channel and the closing edge of the low pressure fresh air inlet channel may be reduced to such an extent that a hindrance of the scavenging action is excluded without losses in precompression. The corresponding calculations can be effected according to known calculating methods for pressure wave machines.

The mere reduction of the ratio of the total opening width of the high pressure channels to the total opening width of the low pressure channels to 1:3.25 or below with a simultaneous limitation of the total opening width of the high pressure channels to 45° at the most allows an improvement in efficiency already, i.e. in an otherwise known pressure wave machine, but it is understood that this improvement in efficiency is particularly effective in a pressure wave machine where the housings or the high pressure channels are adjusted.

The pressure wave machine of the invention comprises another improvement in efficiency due to a water cooling system which is provided at least partially in the air housing and on the rotor casing while it is understood that the cooling is only useful on the air side. The summarily indicated water cooling 44 is disposed in air housing 39 near the rotor bearing and, according to the present example, water cooling 45 is provided in bearing housing 58. A pressure wave machine according to the prior art can be equipped with an approximately equal arrangement.

The cooling water circuit may e.g. be connected to the motor cooling circuit of the internal combustion engine, or a separate cooling circuit or separate cooling circuits may be provided. This water cooling mainly allows an effective cooling of the rotor bearing, and the deviation of a separate air stream from the fresh air with the accompanying drawbacks is no longer necessary.

Furthermore, the water cooling allows a constant clearance between the rotor and the casing and thus an increased efficiency and independence from expensive materials for the rotor and the casing.

The water cooling offers an essential increase in efficiency in otherwise known gas-dynamic pressure wave machines, and an even greater one if it is combined with one or more of the improvement(s) of the pressure wave machine as described above.

In order to yield high charging pressures and a high efficiency, the pressure wave machine according to the prior art strongly depends on the filling degree. In the case of a low flow rate of the internal combustion engine, the filling degree of the rotor of the pressure wave machine will decrease and therefore also the charging pressure. In fact, in this area of the performance field, the machine is too big. If the flow rate of the internal combustion engine is high, the degree of filling strongly increases, and the compression efficiency deteriorates. In this area of the performance field, the pressure wave machine is too small.

The exhaust manifold volume used with pressure wave machines according to the prior art in order to damp the motor pulsations creates disadvantages. The pressure wave machine represents an open system, which means that the exhaust part and the fresh air part are directly connected by the rotor. However, this also means that the motor pressure pulsations are transmitted from the exhaust high pressure section to the fresh air high pressure section.

This drawback can now be eliminated by a direct fresh air supply to the exhaust channel. FIGS. 3 and 4 illustrate the connecting line 46 which leads from the high pressure charge air channel to the high pressure exhaust channel. The positive pressure shocks in the high pressure charge air channel are thereby transmitted to the high pressure exhaust channel. The connection comprises a nonreturn valve 47 which may be provided with an electronic control. In this case, the nonreturn valve acts as a regulation in the sense that only those pressure shocks are transmitted whose energetic level is higher than the momentary pressure in the high pressure exhaust channel. In this manner, mainly the negative pressure pulses are emphasized, i.e. the condition of quasi-negative pressure in the high pressure exhaust channel is emphasized, and the entire pressure level both inside the high pressure exhaust channel and in the high pressure charge air channel is increased by the smoothing of the negative pressure pulses. This allows a significant increase of the pressure level in the rotor before the high pressure exhaust channel opens, and the pulsations arriving from there are damped. Furthermore, this measure reduces the losses in the admission of the hot exhaust gas to the rotor as the entire process is damped.

Another improvement can be obtained if the deviation, which according to FIGS. 3 or 4 is disposed anywhere between the high pressure charge air channel edge and the motor inlet, is disposed directly after the opening edge of the high pressure charge air channel. This preferred embodiment is not illustrated in FIG. 3 for the sake of clarity.

As already mentioned, the pressure wave machine according to the prior art is strongly dependent on the filling degree. In addition to a reduction of the pressure pulsations as described above, the presence of a connection allows the feedback of charge air to the high pressure exhaust side of the pressure wave machine and thus an increase of the mass flow of the machine and thereby an increase of the filling degree, which results in a significant pressure increase. An additional regulation of the feedback amount of high pressure charge air by means of the regulated nonreturn valve may thus be used as a charging pressure regulation in general and as an additional power regulation in the case of a spark ignition engine. In other words, this means that in order to improve the compression efficiency at higher motor flow rates, the pressure wave machine may be designed somewhat larger without a loss of charging pressure at lower motor flow rates. This may also be obtained e.g. by a regulation of the cross-sectional area of the connecting passage by means of a suitable known device such as the controlled nonreturn valve or an additional device for the regulation of the cross-sectional area. This is especially effective in the lower to medium speed, temperature, and load range of the internal combustion engine.

The use of a connection between the fresh air and the exhaust part allows a considerable improvement in efficiency in otherwise known pressure wave machines, but it is particularly effective in combination with one or more of the previously mentioned and described measure(s) for the improvement of the efficiency.

Figure 8:
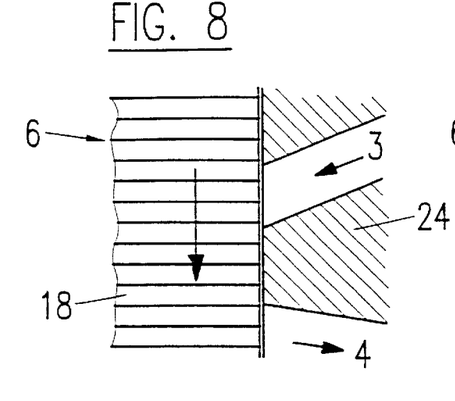
FIG. 8 schematically shows a detail of a developed cylindrical section through the cells of the rotor of a pressure wave machine according to the prior art.

FIGS. 8 to 11A refer to another aspect of the pressure wave machine, i.e. to the action upon the high pressure exhaust flow. Similarly to FIG. 2, FIG. 8 shows a high pressure exhaust channel which does not have means in order to influence the high pressure exhaust flow. Rotor 6 with its cells 18 is represented in a developed view, gas housing 24, high pressure exhaust channel 3 and low pressure exhaust channel 4 being further illustrated.

Figure 9:
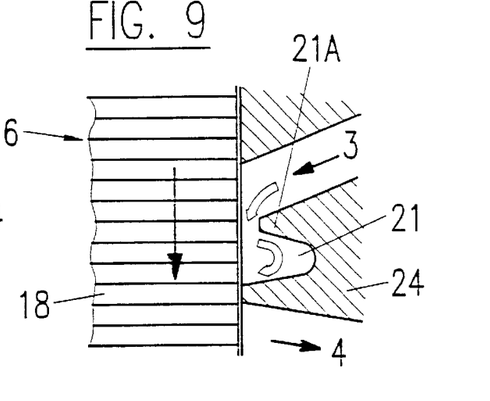
FIG. 9 schematically shows a detail of a developed cylindrical section through the cells of the rotor of another pressure wave machine according to the prior art.

In addition to these elements, FIG. 9 shows gas pocket 21 as it is e.g. provided according to CH-A-681 738 which has been mentioned in the introduction. This gas pocket as well as the necessarily existing web 21A between the high pressure exhaust channel and the gas pocket creates additional losses, especially at low to medium speeds, temperatures and flow rates where a blow-off is normally unnecessary.

In FIGS. 10, 10A, and 11, 11A, elements allowing to influence the high pressure exhaust channel according to the invention is schematically illustrated.

Figure 10:
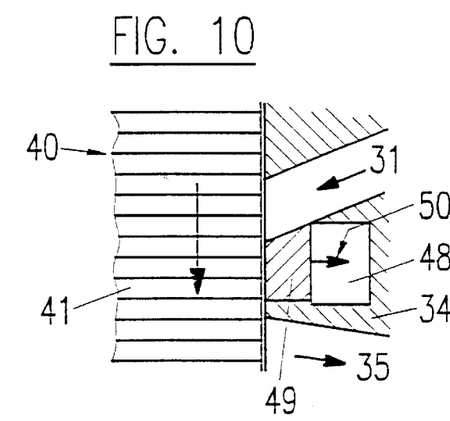
FIGS. 10, 10A schematically show a detail of a developed cylindrical section through the cells of the rotor of a pressure wave machine according to the invention.
Figure 10A:
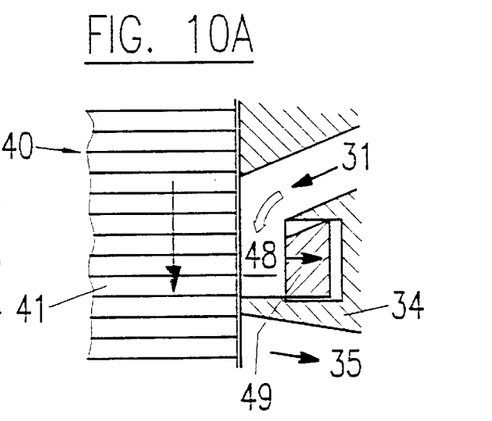

FIGS. 10 and 10A show a developed view of rotor 40 with its cells 41 while gas housing 34 comprises, in contrast to the gas pocket of FIG. 9, a recess 48 which can be modified by a slide valve 49 as indicated by arrow 50. According to FIG. 10A, slide valve 49 is entirely engaged in the direction of the arrow, so that the high pressure exhaust channel is enlarged without the presence of a web. By a suitable control of the slide valve which can be calculated by those skilled in the art, the slide valve may be displaced so as to enlarge the high pressure channel in such a manner that the pressure drops to such a level that the charging pressure produced in the pressure wave process decreases to the desired level.

Figure 11:
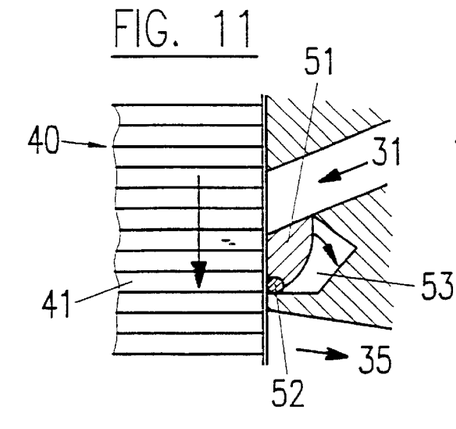
FIGS. 11, 11A show a variant of the embodiment according to FIGS. 10, 10A.
Figure 11A:
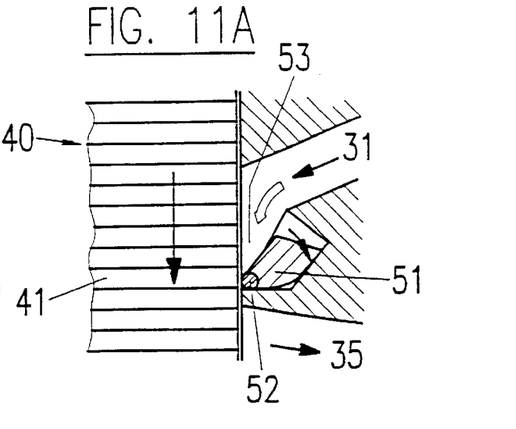

FIGS. 11 and 11A show an alternative embodiment of the slide valve in the form of a swinging element 51 which is hinged on an articulation 52 and is actuated by a similar electronic control allowing an enlargement 53 of the high pressure channel.

At the same time, when the high pressure exhaust channel is enlarged, this device allows an important improvement of the scavenging process through the deviation from the high pressure exhaust to the low pressure process and thus a significant improvement in efficiency. If a spark ignition engine is concerned, this method can also be used as a power regulation through a regulation of the desired charging pressure by suitable measures which are known per se. This measure, i.e. the enlargement of the high pressure exhaust channel and the prevention of gas pockets, allows an essential improvement in efficiency even in pressure wave machines which are otherwise identical to those of the prior art, but as all previously described improvements, it is particularly effective in combination with one or more of the disclosed improvement(s).

Figure 12:
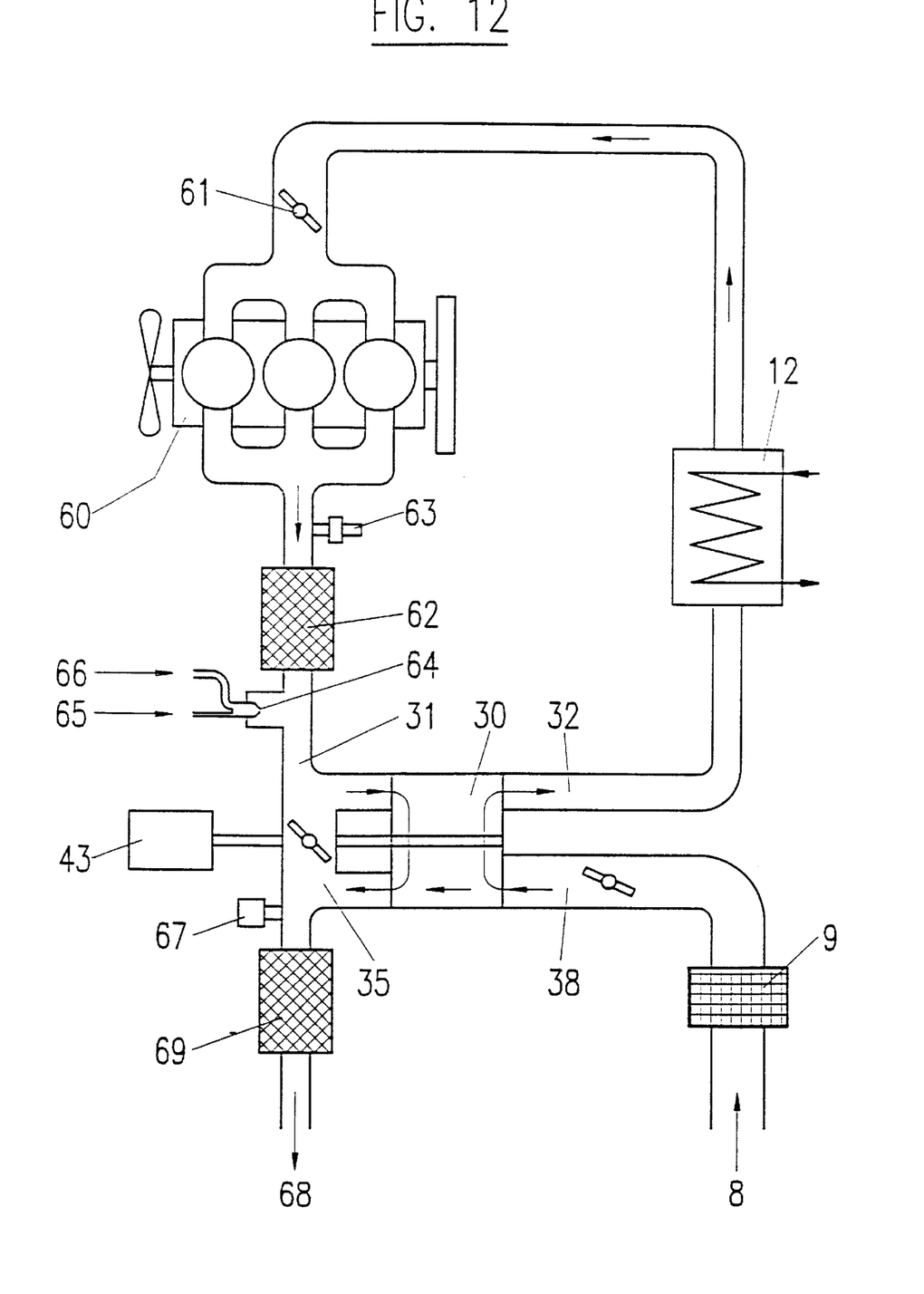
FIG. 12 schematically shows a pressure wave machine comprising a heating device and catalysts.

Another measure for the improvement of the efficiency of the pressure wave machine particularly in cold start conditions is schematically illustrated in FIG. 12 in a simplified manner. Identical elements are designated by the same reference numerals. Pressure wave machine 30 is connected to internal combustion engine 60, e.g. a spark ignition engine, by means of high pressure exhaust channel 31 and high pressure charge air channel 32. Furthermore, the pressure wave machine comprises the two low pressure channels 35 and 38, and air filter 9, charge air cooler 12, a throttle 61 as well as motor output 43 are illustrated.

In the case of the spark ignition engine, a regulated three-way catalyst 62 comprising a lambda probe 63 is disposed between the outlet of the engine and the high pressure exhaust channel. In order to improve the cold start behaviour, a heating device 64 in the form of a burner comprising a fuel supply 65 and an air supply 66 is interposed between the three-way catalyst and the high pressure exhaust channel. Numeral 67 designates a temperature probe. At this point, the heating device acts both on the catalyst and on the pressure wave machine and thus provides an improvement of the cold start properties of both aggregates.

In order to obtain a particularly efficient exhaust gas cleaning, another catalyst is provided between the low pressure exhaust channel and exhaust pipe 68, i.e. an oxidation catalyst.

The use of a heating device acting upon the high pressure exhaust channel allows to prevent that the pressure wave supercharger runs at an insufficient energy level during cold start and thus makes use of the gas pocket or necessitates an enlargement of the high pressure exhaust channel. Accordingly, the use of the heating device reduces or entirely prevents a flow towards the gas pockets, and the charging pressure is built up substantially faster. The closure of the gas pockets allows to prevent that a part of the heating energy is blown off unused. The same applies for a system without three-way catalysts, e.g. for a diesel engine, which may only comprise the mentioned oxidation catalyst at a point upstream or downstream of the pressure wave machine.

As in the preceding examples, the heating device already offers an improvement in a pressure wave machine provided with a high pressure exhaust channel enlarging device, and a greater one if it is applied to a pressure wave machine including one or more of the preceding improvements as well as one or two catalysts or no one.

What is claimed is:

1. A gas-dynamic pressure wave machine for a charge air supply of an internal combustion engine, the pressure wave machine comprising:
   a driven rotor;
   an air housing having an air inlet channel in communication with the rotor and a charge air channel leading from the rotor to an inlet of the internal combustion engine;
   a gas housing having a first exhaust channel leading from an exhaust of the internal combustion engine to the rotor and a second exhaust channel in communication with the rotor,
   each one of the channels communicating with the rotor through openings in their respective housings,
   the air housing being rotatable around an axis of each the rotor and the gas housing such that the openings of the charge air channel and the first exhaust air channel are selectively aligned so as to adjust the pressure wave over the entire performance field of the internal combustion engine.

2. A gas-dynamic pressure wave machine according to claim 1, wherein the air housing is rotatable by one of an electric servo motor, a pneumatic controller, a mechanical controller, or a hydraulic controller.

3. A gas-dynamic pressure wave machine according to claim 1, further comprising:

a rotor casing surrounding the rotor; and a rotatable bearing positioned between the rotor casing and the air housing.

4. A gas-dynamic pressure wave machine according to claim 1, wherein the rotor is a free-wheeling rotor without an external drive.

5. A gas-dynamic pressure wave machine according to claim 1, wherein the ratio of the width of the openings of the charge air channel and the first exhaust channel to the width of the openings of the air inlet channel and the second exhaust channel is equal to or less than 1:3.25.

6. A gas-dynamic pressure wave machine according to claim 5, wherein an angular difference between the opening of the second exhaust channel and the opening of the air inlet channel do not hinder a scavenging action of the pressure wave machine.

7. A gas-dynamic pressure wave machine according to claim 1, further comprising at least one of a gas pocket, a compression pocket and an expansion pocket in one of the air housing and the gas housing.

8. A gas-dynamic pressure wave machine according to claim 1, further comprising a connection between the charge air channel and the first exhaust channel.

9. A gas-dynamic pressure wave machine according to claim 8, wherein the connection comprises a nonreturn valve operable to prevent exhaust gas from the first exhaust channel from entering the charge air channel.

10. A gas-dynamic pressure wave machine according to claim 1, wherein the first exhaust channel larger on the rotor side than the internal combustion engine side.

11. A gas-dynamic pressure wave machine according to claim 10, wherein the first exhaust channel includes a member operable to vary the degree to which the rotor side is larger than the internal combustion engine side.

12. A gas-dynamic pressure wave machine according to claim 11, wherein the member is a controlled slide valve.

13. A gas-dynamic pressure wave machine according to claim 11, wherein the member is a swinging slide valve.

14. A gas-dynamic pressure wave machine according to claim 1, wherein the pressure wave machine is connected to a spark ignition engine and includes a three-way catalyst disposed between an outlet of the engine and the first exhaust channel of the pressure wave machine.

15. A gas-dynamic pressure wave machine according to claim 14, wherein an oxidation catalyst is connected between the second exhaust channel and an outlet of the pressure wave machine.

16. A gas-dynamic pressure wave machine according to claim 14, further comprising a heating device disposed between the three-way catalyst and the first exhaust channel of the pressure wave machine.

17. A gas-dynamic pressure wave machine according to claim 16, wherein the heating device acts upon the first exhaust channel.

18. A gas-dynamic pressure wave machine according to claim 17, wherein the heating device is a burner comprising an air and a fuel supply.

19. A gas-dynamic pressure wave machine according to claim 17, wherein the heating device is an electric heating device.

20. A gas-dynamic pressure wave machine according to claim 3, wherein the rotatable bearing comprises:

two bearing rings fastened to the rotor casing; and two bearing rings fastened to the air housing.

21. A gas-dynamic pressure wave machine according to claim 4, wherein the free-wheeling rotor includes a brake.

22. A gas-dynamic pressure wave machine for a charge air supply of an internal combustion engine, the pressure wave machine comprising:

a driven rotor;

an air housing having an air inlet channel in communication with the rotor and a charge air channel leading from the rotor to an inlet of the internal combustion engine;

a gas housing having a first exhaust channel leading from an exhaust of the internal combustion engine to the rotor and a second exhaust channel in communication with the rotor, each one of the channels communicating with the rotor through openings in their respective housings, at least one of the opening of the charge air channel and the opening of the first exhaust channel being operable to vary its width so as to adjust the pressure wave over the entire performance field of the internal combustion engine.

23. A gas-dynamic pressure wave machine according to claim 22, wherein the width of the opening in the housing is varied by a diaphragm.

24. A gas-dynamic pressure wave machine according to claim 23, wherein the diaphragm is rotated to variate the width of the opening.

25. A gas-dynamic pressure wave machine according to claim 24, wherein the diaphragm is rotated by one of an electric servo motor, a pneumatic controller, a mechanical controller, or a hydraulic controller.

26. A gas-dynamic pressure wave machine according to claim 22, wherein the ratio of the width of the openings of the charge air channel and the first exhaust channel to the width of the openings of the air inlet channel and the second exhaust channel is equal to or less than 1:3.25.

27. A gas-dynamic pressure wave machine according to claim 4, wherein the diaphragm is a double sector diaphragm.

28. A gas-dynamic pressure wave machine according to claim 5, wherein the width of the openings of the charge air channel and the first exhaust channel is not greater than 45°.

29. A gas-dynamic pressure wave machine for a charge air supply of an internal combustion engine, the pressure wave machine comprising:

a rotor having a casing;

an air housing having an air inlet channel in communication with the rotor and a charge air channel leading from the rotor to an inlet of the internal combustion engine;

a gas housing having a first exhaust channel leading from an exhaust of the internal combustion engine to the rotor and a second exhaust channel in communication with the rotor; and a water cooling system operable to cool one of the rotor casing and the air housing.

30. A gas-dynamic pressure wave machine according to claim 29, wherein the water cooling system is supplied by a cooling water circuit of the internal combustion engine.

31. A gas-dynamic pressure wave machine according to claim 29, wherein the water cooling system is supplied by a separate cooling water circuit.

32. A gas-dynamic pressure wave machine according to claim 29, further comprising:

a bearing housing mounted on the air housing for rotation of the air housing relative to the gas housing and the rotor, wherein the water cooling system is enclosed in the bearing housing.

* * * * *